March 1, 1960          S. L. AYRES          2,926,558
MERCHANDISING VISUAL DISPLAY
Filed Sept. 10, 1956
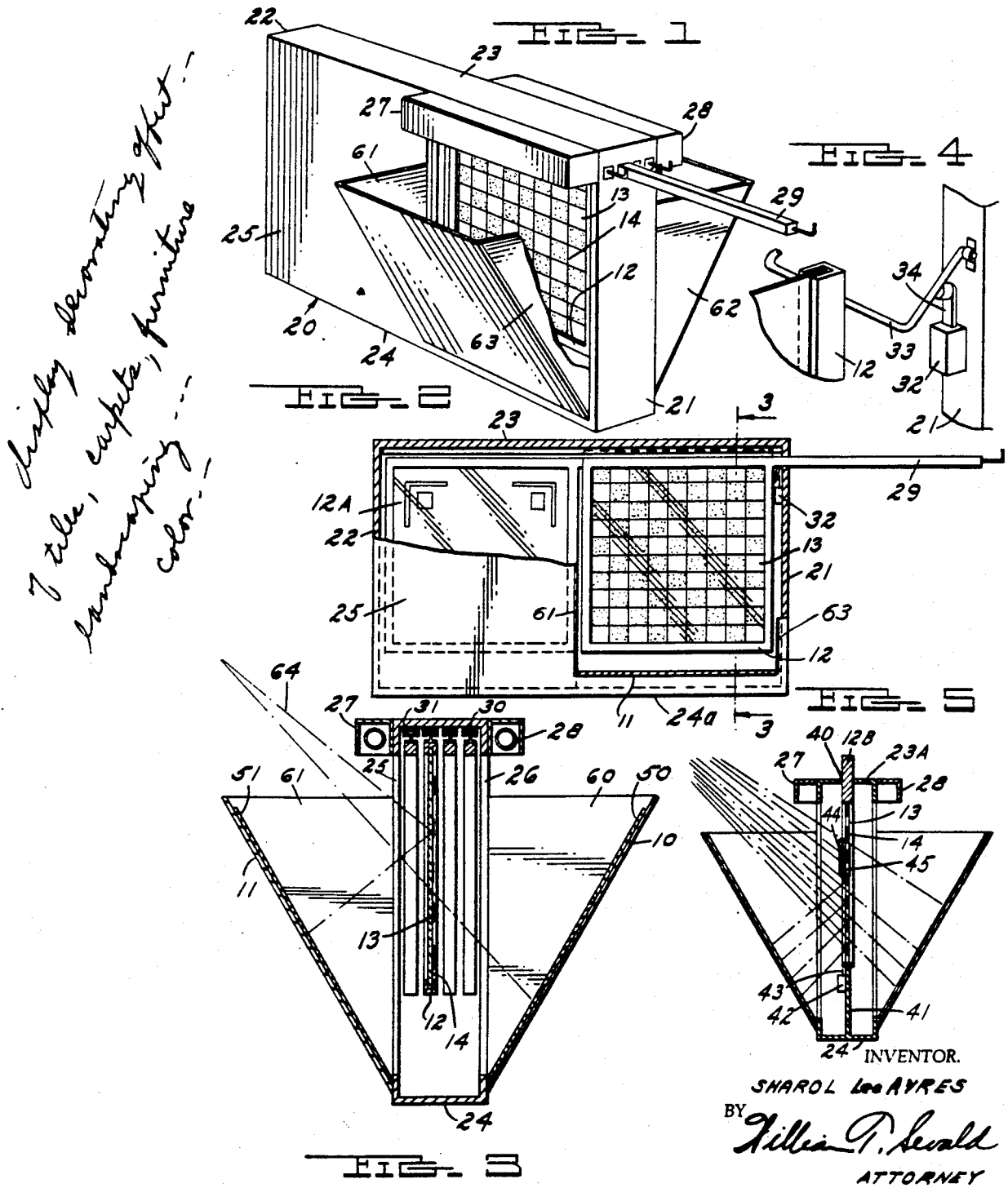
INVENTOR.
SHAROL Lee AYRES
BY
ATTORNEY

2,926,558
MERCHANDISING VISUAL DISPLAY

Sharol Lee Ayres, Farmington, Mich.

Application September 10, 1956, Serial No. 608,956

8 Claims. (Cl. 88—1)

This invention relates to a viewing device and more particularly pertains to a merchandising visual display device for showing patterns, shape, style, size, proportion etc. in conjunction with contrasting or blending color incident thereto.

Viewing and display devices have been employed heretofore to facilitate the sale of various items, however, the several devices of the prior art have not proven entirely satisfactory inasmuch as they are complicated in design and construction, expensive to manufacture, difficult to use, and usually employ a peep-hole through which only one person can look at a time.

With the foregoing in view, the primary object of the invention is to provide a visual viewing or display device particularly suitable for merchandising which is simple in design and construction, inexpensive to manufacture, easy to use, and which does not employ a peep-hole through which only one person can look but rather, presents a wide area of view for several persons to look simultaneously and discuss the displayed material under consideration.

An object of the invention is to provide a viewing device having opposed angled panels for supporting material or a colored back-ground with one panel exposed to the lines of sight of the viewers and the other panel concealed from the lines of sight of the viewer.

An object of the invention is to provide a screen between the angled panels within the lines of sight of the viewer which is equipped with clear portions through which the viewer can see the panel disposed in the lines of sight and reflected portions via which the viewer can see the panel disposed out of the lines of sight by the reflector portions of the screen.

An object of the invention is to provide an opaque area in the screen having a depiction of an object which would normally be associated with the pattern of the screen and the material and colors of the panels which neither permits the lines of sight to penetrate to the panel in the lines of sight nor does it provide reflection of the panel disposed out of the lines of sight.

An object of the invention is to provide opaque portions in the screen having line delineations through which a color mat disposed on the back of the screen can supply a color different from any other color used in the panels to provide the body color for the object depicted in the opaque area.

An object of the invention is to provide various screens having different clear and reflector portions disposed in different patterns.

An object of the invention is to provide a receiving surface on the panels disposed on either side of the screen suitable for supporting different colored material such as floor tile and rug squares.

An object of the invention is to provide a base for supporting the angled panels and screens in properly angulated and adjusted positions.

An object of the invention is to provide means in the case for easily inserting and removing various patterned screens in the viewing area thereof.

An object of the invention is to provide at least one light so as to provide concentrated illumination on the material disposed on the panels and on the screen including the opaque portions thereof.

An object of the invention is to provide a switch associated with the screens which is adapted to be closed to cause illumination when the screen is fully inserted and which is adapted to cut off illumination when the screen is partially extracted.

An object of the invention is to provide a versatile device for viewing various particular patterns and colors which is particularly suitable to the building trades such as floor tile, wall tile, furniture, appliances, interior decorating, out door landscaping, and any other type of merchandising or any type of article.

An object of the invention is to provide a merchandiser viewer which can be manufactured inexpensively as the component parts are easily made and the assembly of parts is readily accomplished.

An object of the invention is to provide a merchandiser viewer which can be operated with ease by the professional salesman and which is substantially salesman and customer foolproof.

An object of the invention is to provide a viewer for merchandising which can be fitted to any and all sizes of designs and patterns without changes in the assembly or arrangement of parts.

An object of the invention is to provide a merchandiser viewer which is capable of presenting to the inexperienced customer the actual design of the material or articles that he is purchasing in a setting similar to which it will be disposed in use.

These and other objects of the invention will become apparent by reference to the following description of a viewing device particularly suitable to merchandising embodying the invention taken in connection with the accompanying drawing in which;

Fig. 1 is a perspective view of a viewer embodying the invention having side-sliding screens and a magazine for containing a variety of screens of various patterns.

Fig. 2 is a side elevational view of the device seen in Fig. 1, partly in cross-section, showing a screen in the viewing portion and a screen in the magazine portion.

Fig. 3 is a cross sectional view of the device seen in Fig. 2 taken on the line 3—3 thereof.

Fig. 4 is an enlarged fragmentary view of the switch and screen actuating thereof in the device seen in Figs. 1–3; and Fig. 5 is a view similar to Fig. 3 of a modified device with the magazine portion removed showing a top insertable and removable screen and a switch actuated thereby.

Referring now to the drawing wherein like numerals refer to like and corresponding parts throughout the several views, display device shown therein to illustrate the invention comprises a far panel 10 disposed on an angle so as to intercept the lines of sight from a viewer and a near panel 11 adapted to be by-passed by the lines of sight of the viewer, a screen 12 disposed in the lines of sight of the viewer and located between the panels 10 and 11 having clear portions 13 adapted to permit penetration of the lines of sight therethrough to the far panel 10 and reflector portions 14 adapted to bend or transfer the lines of sight to the near panel 11 so that from the viewer's stand-point as indicated when he looks at the device into the viewing area thereof he sees presented on the screen the portions of the material disposed on the far panel 10 through the clear portions of the screen and in any color that it may embody and he sees on the reflector portions 14 of the screen the material disposed on the near panel 11 and in any contrasting or blending color embodied therein, and due to the fact that the screens in their clear and reflecting portions are designed in patterns, a pattern or design will be seen by the viewer by looking at the screen 12.

More particularly, and describing the device incident to the sale of floor tile for purposes of explaning of the operation, use, and purpose of the device, the case 20 is comprised of end portions 21 and 22 interconnected by a top portion 23 and a bottom portion 24 and the width of the portions 21 to 24 is coordinated with the desired distance required between the bottoms of the angled panels 10 and 11.

The device is covered in the magazine portion by the side walls 25 and 26 and is completely open in the viewing portion thereof adjacent the angled panels 10 and 11; lights 27 and 28 are disposed above the viewing area for the purpose of projection illumination on the screen 12 and the panels 10 and 11 top surfaces.

The screens 12 may be conveniently disposed on the slide rods 29 equipped with bearings 30 which are slidably disposed in the channels 31 so that the screens 12 may be conveniently moved from the viewing area into the magazine area and vice-versa. It is to be particularly noted that the screen 12 is a checker-board pattern and that the screen 12A has a corner design pattern and that it is to be further understood that the other screens disposed in the slides of the device have patterns different from the screens 12 and 12A for the purposes of variety and providing the viewer with a selection of various designs.

The switch 32 is disposed on the inside of the end member 21 and is adapted to be operated by the pivotally mounted lever 33 in conjunction with the slides 12 being moved in and out of the viewing area in that when the slide 12 is moved completely out via the rod 29, the end of the screen 12 contacts the lever 33 which in turn operates the switch arm 34 to close the circuit to the lights 27 and 28 and, conversely when the screen 12 is moved away from the lever 33 the switch arm 34 is permitted to open the circuit in the switch 32 to terminate the power supply to the lights 27 and 28.

Referring now to the modified device seen in Fig. 5, it is to be noted that the no magazine area is provided, that the case comprises only the viewing portion of the device, that the top portion 23A is provided with a slot 40 for receiving the screen 12B therein, that the bottom portion 24A is provided with an up-standing baffle 41 which is adapted to have the screen 12B rest thereon to prevent further downward movement thereof, and that the switch 42 is mounted on the baffle 41 and has a plunger 43 adapted to be operated by the screen bearing thereon to close the circuits to the lights 27 and 28 and to open the circuit to the lights 27 and 28 when a screen 12B is removed therefrom. The screen 12B is also provided with clear portions 13 and reflector portions 14, and additionally, the screen 12B is provided with an opaque design portion 44 which equipped with a line outline of an object such as a chair or table on a clear area of the screen and a colored mat 45 is placed behind the object outline 44 so as to provide a colored body for the line depiction thereon.

The screens by integrating the reflector portions and the clear portions can be so embodied that they entail a checker board pattern, a corner design pattern, zig-zag patterns, and any other pattern or arrangement as desired.

In operation, and using floor-tile by way of example, a tile 50 of one color such as red is disposed against the far panel 10 while another tile 51 of another color such as green is disposed in the device adjacent the near panel 11 it will be understood that when the screen is not in position in the viewing area that the viewer sees only the red tile 50 whereas when the screen is placed in position between the panels 10 and 11 the viewer sees the red tile 50 through the clear portions 13 of the screen and sees the green tile 51 adjacent the near panel 11 in the reflector portions 14 of the screen 12 so that he sees in direct view portions the tile 50 and in reflected view portions of the green tile 51 as permitted by the clear and reflector portions of the screen 12 and in the design embodied in the screen 12. To change the design, the salesmen or operator merely changes the screen and thereby gives the viewer a different design embodying the same colors. In the event that the viewer or customer desires other colors in any pattern the salesman merely changes the tiles 50 and 51 to any other colors as desired. It may now be seen that as many combinations can be viewed as provided by the multiple of the screens and the multiple of the various color combinations available in the tiles and it is to be understood that should the viewer wish a reverse color pattern such as in conjunction with screen 12A which has a reflector portion and corner designs in clear that the red tile 50 can be changed to adjacent the near panel 11 and the green tile 51 changed to be adjacent the far panel 10 thereby reversing the field and design of the color scheme.

The panels 10 and 11 are supported relative to the case 10 by the shrouds 60—63 and the shrouds provide means for blocking a view into the device other than at the proper angle of sight as depicted by the dotted lines 64 and 65 of the drawing and the shrouds 60—63, in conjunction with the panels 10 and 11, form a neat pocket for receiving the tiles 50 and 51 or rug squares or any other element desired to be displayed in conjunction with the pattern and design of the screens 12.

In selling items such as tile, the salesman or displayer disposes the tiles or rug squares adjacent the panels 10 and 11 and extracts a screen from the magazine area or inserts a screen from the top, as seen in Fig. 5 and whereupon the lights are turned on showing the tiles or rug squares or other material in vivid contrast and it is to be noted that the salesman and viewer such as husband and wife buying tile, carpeting, furniture, or landscaping can then all look at the design in its contrasting colors together with the salesman and this provides a established pattern in color, size, shape, and proportion for the several viewers to discuss, decide, and determine.

The inventive viewer or display device is particularly suitable for merchandising various articles and constitutes a compact, durable, and neat appearing mechanism easily operated to show various designs and various contrasting or blending colors; and it is easily operated to change colors, materials, and designs and is substantially salesman and customer foolproof as far as damage and misoperation is concerned and presents an attractive appearance of the material displayed as though much laborious time had been consumed in making the design or pattern.

Athough but two embodiments of the invention have been shown and described in detail, it is obvious that many changes may be made in the size, shape, detail, angulation, and arrangements of various elements of the invention within the scope of the appended claims.

I claim:

1. A viewing device, particularly suitable for visually displaying the decorating effects of items such as tile, carpet, furniture, landscaping, etc. embodying color, shape, style, pattern, size, proportion etc., comprising a case having open opposite sides bounded on the ends, top, and bottom by walls defining a viewing area, a screen having transparent areas and non-transparent areas in said case disposed in said viewing area, panels on either side of said case partially blocking said open sides angling upwardly outwardly from said wall defining said case bottom, shroud members disposed between said panels and said case sides at the ends thereof; said case, panels, and shrouds providing a pocket on either side of said case open sides having an open top providing a viewing area through which a view is presented angularly downwardly at an angle substantially normal to said opposite panel through said screen; said screen having reflector portions in its non-transparent area adapted to reflect the line of sight toward said near panel at an angle substantially normal thereto so that a view is presented showing portions of both said panels at the same time as per said non-transparent and transparent areas of said screen; said panels being adapted to removably support items such as tile, carpet, or other material so as to present the items to view.

2. An open viewer capable of presenting a view to several persons at the same time comprising a far panel disposed substantially normal to the line of sight and a near panel disposed substantially parallel to the line of sight; said panels defining an included angle; and a design screen disposed in the line of sight between said panels dividing the included angle of said panels; said screen having a design of clear portions through which the line of sight penetrates to said far panel and reflector portions which turn the line of sight to said near panel so that a view is presented at said screen of the near and far panels in a composite design pattern of both panels as controlled by said screen.

3. An open viewer capable of presenting a view to several persons at the same time comprising a far panel disposed substantially normal to the line of sight, a near panel disposed substantially parallel to the line of sight; said panels defining an included angle; and a screen disposed in the line of sight between said panels dividing the included angle of said panels; said screen having clear portions through which the line of sight penetrates to said far panel and reflector portions which turn the line of sight to said near panel, said screen having an opaque portion interrupting the lines of sight which neither permit penetration nor reflection thereof, and at least one light projecting illumination on said panels and screen so that a view is presented clearly showing portions of said near panel via said screen reflector portions, the opaque portions of said screen and portions of said far panel through said screen transparent portions.

4. A viewer capable of presenting a view to several persons simultaneously comprising a far panel having a face disposed so as to interrupt the line of sight, a near panel having a face disposed so as to be by-passed by the line of sight, a screen disposed between said panels so as to interrupt the line of sight, clear portions in said screen permitting penetration of the line of sight to said far panel, and reflector portions in said screen bending the line of sight to said near panel; said screen having at least one opaque portion which interrupts the line of sight and which neither permits penetrating nor provides reflection for the line of sight; said device presenting a view composed of portions of said far panel via said screen clear portions, portions of said near panel via said screen reflector portions, and the opaque portions of said screen.

5. A viewer capable of presenting a view to several persons simultaneously comprising a far panel having a face disposed so as to interrupt the line of sight, a near panel having a face disposed so as to be by-passed by the line of sight, a screen disposed between said panels so as to interrupt the line of sight, clear portions in said screen permitting penetration of the line of sight to said far panel, and reflector portions in said screen bending the line of sight to said near panel; said screen having at least one opaque portion which interrupts the line of sight and which neither permits penetrating nor provides reflection for the line of sight; said device presenting a view composed of portions of said far panel via said screen clear portions, portions of said near panel via said screen reflector portions, and the opaque portion of said screen, said screen being removable and replaceable between said panels to facilitate the disposition between said panels of different screens having varied clear, reflector, and opaque portions.

6. A viewer for presenting a view to several persons simultaneously comprising a far panel having a face disposed so as to interrupt the line of sight, a near panel having a face disposed so as to be by-passed by the line of sight, a screen disposed between said panels so as to interrupt the line of sight, clear portions in said screen permitting penetration of the line of sight to said far panel, and reflector portions in said screen bending the line of sight to said near panel; said screen having at least one opaque portion which interrupts the line of sight and which neither permits penetrating nor provides reflection for the line of sight; said device presenting a view composed of portions of said back panel via said screen clear portions, portions of said front panel via said screen reflector portions, and the opaque portions of said screen; said screen being removable and replaceable between said panels to facilitate the disposition between said panels of different screens having varied clear, reflector, and opaque portions; said panels being capable of supporting superimposed removable and replaceable varied elements such as material of different color; said opaque portions being depictions of various elements in various colors; said depiction outlines being in opaque line and body portions clear; and a colored opaque mat disposed behind said depictions of an element showing color through said clear body portions.

7. A top angle viewer capable of presenting a view to several persons at the same time comprising a far panel disposed to interrupt the line of sight, a near panel disposed to be bypassed by the line of sight; said panels defining a downwardly converging included angle; a screen disposed in the line of sight between said panels dividing the included angle of said panels; said screen having clear portions through which the line of sight penetrates to said far panel and reflector portions which turn the line of sight to said near panel; a frame surrounding said screen area adapted to support said screen and to interconnect said panels, shroud members disposed between the sides of said frame and the sides of said panels, and a baffle disposed between said frame bottom and said screen.

8. A top angle open viewer capable of presenting a view to several persons at the same time comprising a far panel disposed to interrupt the line of sight, a near panel disposed to be by-passed by the line of sight; said panels defining a downwardly converging included angle; a screen disposed in the line of sight between said panels dividing the included angle of said panels; said screen having clear portions through which the line of sight penetrates to said far panel and reflector portions which turn the line of sight to said near panel; at least one light projecting illumination on said panels and screen presenting a view showing portions of said far panel through said screen clear portions of said near panel via said screen reflector portions, and a switch adapted to be operated by said screen so that said switch is closed by a fully inserted screen to power said light and permitted to open by a partially removed screen to cut off power to said light.

References Cited in the file of this patent

UNITED STATES PATENTS

| | | |
|---|---|---|
| 1,821,626 | Fleischer | Sept. 1, 1931 |
| 1,979,119 | Radzinsky | Oct. 30, 1934 |
| 1,989,803 | Hoben | Feb. 5, 1935 |
| 2,061,378 | Henze et al. | Nov. 17, 1936 |
| 2,085,180 | Bevis | June 29, 1937 |
| 2,168,352 | Lawry | Aug. 8, 1939 |
| 2,257,981 | Scott | Oct. 7, 1941 |
| 2,684,013 | Rosenbloom | July 20, 1954 |

FOREIGN PATENTS

| | | |
|---|---|---|
| 230,454 | Great Britain | May 13, 1926 |
| 286,329 | Great Britain | Feb. 28, 1928 |